Feb. 25, 1930.  J. HENRICH  1,748,289
MACHINE FOR SUBDIVIDING BARS WHILE BEING ROLLED
Filed Sept. 21, 1926  2 Sheets-Sheet 1
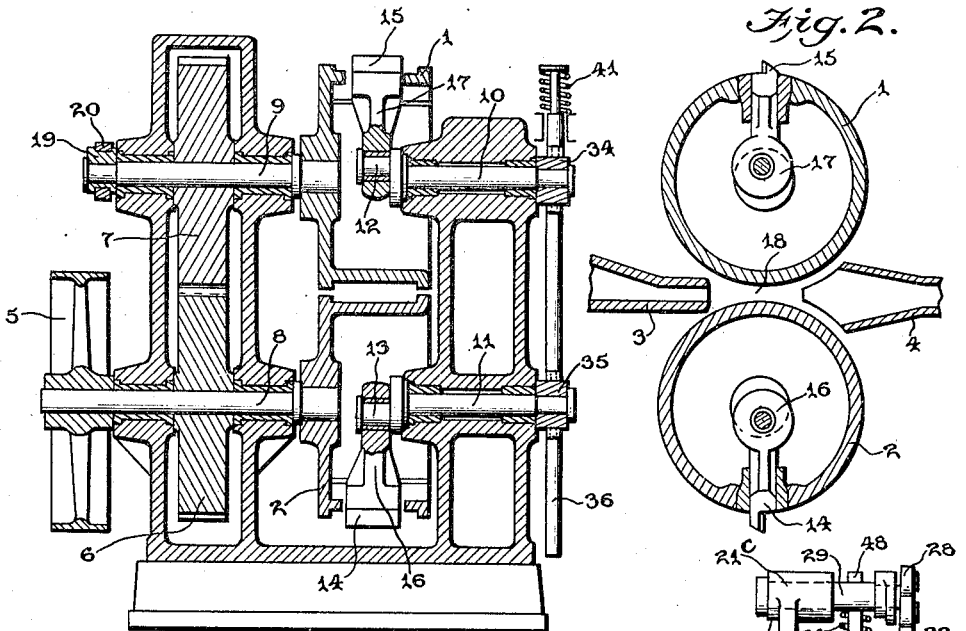
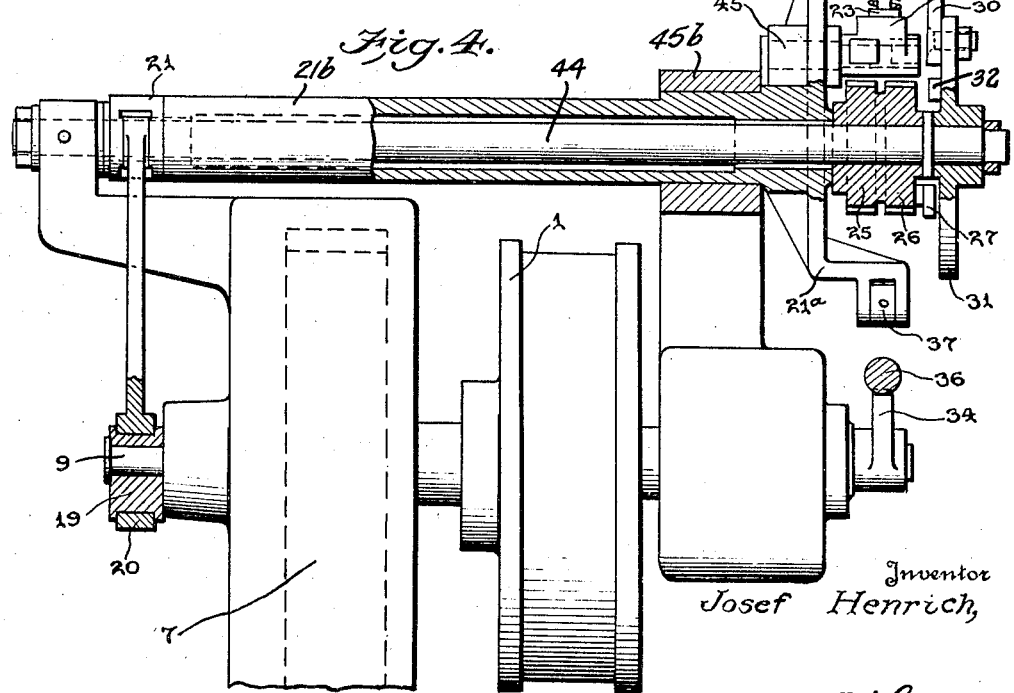
Inventor
Josef Henrich,
By William C. Linton
Attorney

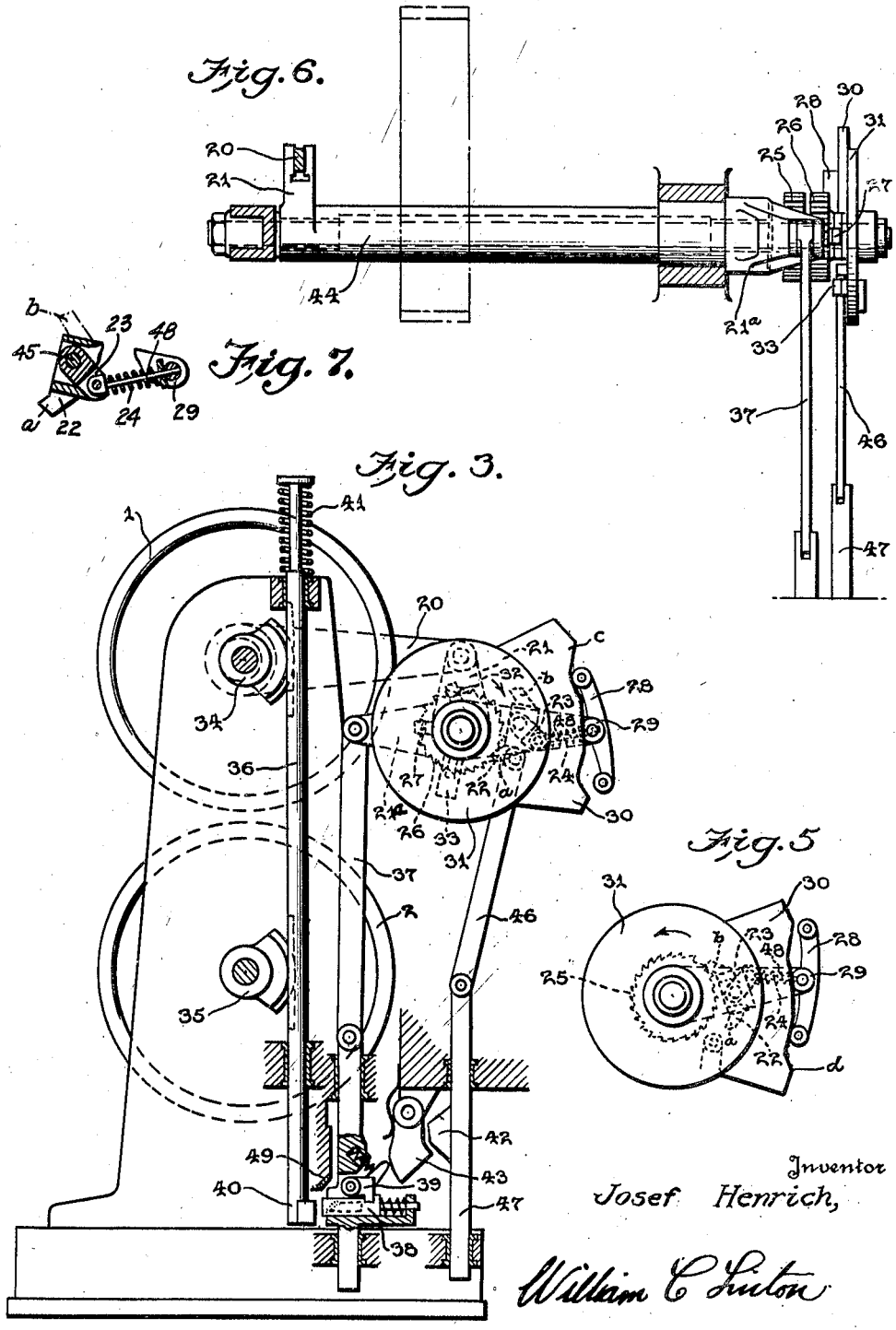

Patented Feb. 25, 1930

1,748,289

UNITED STATES PATENT OFFICE

JOSEF HENRICH, OF RHEYDT, GERMANY

MACHINE FOR SUBDIVIDING BARS WHILE BEING ROLLED

Application filed September 21, 1926, Serial No. 136,865, and in Germany November 1, 1924.

My invention relates to a machine intended for subdividing or cutting bars while being rolled and moved forward, this machine being one of that type in which the cutting tools circulate continually around an axle and are moved also radially with respect to that axle. The object of this invention is to provide means by which the periods of time between the individual cuts or actions of the tool, and thus also the length of the individual pieces, can be varied at will, and for this purpose a control device driven by the main shaft of the machine is provided, and the tools are arranged on levers oscillated by rotation of the drums, and supported on pivots located eccentrically with respect to the axes of said drums, and adapted to be controlled independent of the other arrangement and combination of parts.

The invention is illustrated by way of example in the accompanying drawings, in which:

Figure 1 is a vertical longitudinal section through the machine,

Figure 2 is a cross section of the shearing device proper,

Figure 3 shows the machine on an enlarged scale, having the length measuring device attached thereto, Figure 4 illustrates a portion of the machine in upright position with parts in cross section, Figures 5 and 6 represent parts of the measuring device, and Figure 7 is a detail of the pawl mechanism of the length measuring device.

The details are as follows:

Two drums 1 and 2 arranged one above the other and of which the lower one serves as a conveying drum for the rod guided by the members 3 and 4 are rotated continually by the pulley 5, the shaft 8, the cog-wheels 6 and 7, and the shaft 9, as shown in Fig. 1. The drums are open on that side located counter to said cog-wheels, and carry the shafts 10 and 11 extending through said drums and provided with eccentric pivots 12 and 13 carrying oscillating levers 16 and 17 provided with cutting tools or blades 14 and 15, said levers being carried round by the drums, but moving not around the drum axes but around the axes of the two eccentric pivots. The position of these latter can be varied by means described hereinafter.

In the position the said pivots as shown in Fig. 2, the cutting edges of the blades move along on a circle shifted relatively to the axes of the drums as much as corresponds to the eccentricity of the eccentric pivots. In this position the blades can not contact with the bar moved forward through the guide members 3 and 4. If cuts are to be made, the shafts 10 and 11 must be so turned that the pivots approach the path of the rod to be subdivided or cut until their cutting edges pass along one another in the point 18, Figure 2.

The power required to cause the knives to effect the cutting is only comparatively small due to the arrangement of the operating shafts 10 and 11 which have practically no resistance to overcome during their to-and-fro action or oscillating motion. The diameter of the drums 1 and 2 and the length of the oscillating blade holders 16 and 17 is such that the rod just being worked in the machine has been moved forward just by 1 meter when each drum has made one revolution, in consequence whereof it is easily possible to cut or subdivide the rods in lengths representing a multiple of 1 meter.

As even with very clever attendance to the machine it is, in view of the high speed of the bars when passing through the machine, viz with 9 meters and even more per second, not possible to seize just the proper point of time as regards subdividing the rod for a certain definite number of meters, an automatically operating length measuring device has been designed. This device is constructed as follows:

The continually rotating shaft 9 actuates by means of an eccentric pivot 19 through an arm 20, a lever mechanism, consisting of the lever 21 suitably fixed to one end of the tubular member 21ᵇ on the opposite end of which is carried by the lever arm 21ᶜ, a double pawl 22 engaged by the pivot bolt 45, the intermittent lever 23 and the spring 24. The tubular member 21ᵇ is mounted onto the machine by means of bearing 45ᵇ and rests freely upon a shaft 44 fastened onto the frame or body of the machine and received within said tubular member. Besides there is attached to this lever 21 another bolt 29, carrying on its outer end a pawl reversing lever 28. Between the pivot bolts 45 and 29 there is an operating device for the double pawl 22, which is governed by the lever 28. The snap operating device consists of a lever 23, a rod 48 and a spring 24, attached to said rod. The lever 23 is also freely movable upon the bolt or pivot 45, but is connected to the double pawl 22 for actuating the same. The rod 48 connected to lever 23 passes through a hole, transversely formed through pivot bolt 29. Now if the pivot bolt 29 is rotated through actuation of lever 28, the lever 23 is turned in the opposite direction and thereby the effect of pressure of the spring 24 is changed from one side of the double pawl 22 to the opposite side, causing the oscillation of the double pawl 22, which is provided with two working surfaces "a" and "b", so that the double pawl engages either with ratchet wheel 26 with its working surface "a" or else engages with ratchet wheel 25 by its working surface "b". These two ratchet wheels are rigidly connected with each other and turn freely on the shaft 44 journaled in the tubular member 21ᵇ and fixed to portions of the machine.

Further, on shaft 44 there is arranged a disk 31, which operates by means of a cam 30 carried thereby and in engagement with the reversing lever 28. Attached to the disk 31 is a fixed abutment 32 and adjustable abutment 33 capable of being suitably positioned at various points upon the disk 31, as for instance, by securing said abutment within different openings formed in series upon the surface of said disk. In the plane of these two abutments 32 and 33 there is a third abutment 27 which is fastened onto ratchet 26. The movement of the ratchet wheels actuates the disk 31 only when the abutment member 27 as in the position shown in Figure 3, strikes against the abutment 32 or 33. Upon striking the abutment 32 the cam 30 is laterally moved in the direction of the arrow (Figure 3), the consequence of which is that the working face "c" of the curved member turns the lever 28 over into the position shown in Figure 5. Thereby the double pawl 22 is actuated so that the ratchet wheels are now turned in the opposite direction until the abutment 27 strikes the adjusted abutment 33 of the disk 31, causing the disk 31 together with the cam 30 to turn in the direction of the arrow (Figure 5), the lever 28 being turned over by the working surface "d" of the cam 30 into the position shown in Fig. 3, whereupon the operation hereinbefore described is repeated. The abutment 27 thus advancing step by step between the abutments 32 and 33 continually oscillates with every stroke against the latter, the disk 31 thereby undergoes a short interrupting movement first in one direction, then in the other.

This interrupting movement of the disk 31 places the shears into cutting position. For this purpose the eccentrically mounted shafts 10 and 11 (Figure 1) are provided at their outwardly directed extensions with cogged sections 34 and 35 connected with each other by a common cogged rod. A vertical displacement of this cogged rod brings about a turning of the eccentrically mounted shafts 10 and 11 and a change of the eccentric pivots into that position which enables the knife blades to perform a shearing motion in point 18 (Figure 2).

The cogged rod or rack 36 undergoes with every shearing movement a back and forth movement, working in unison with the swinging movement of the knife blades. This movement is initiated by the oscillating movement of the lever 21 operating through the tubular member 21ᵇ a second arm 21ᵃ, by which with the help of a rod 37 (Figs. 3, 4 and 5) the engagement device consisting of a spring actuated pin 38 normally held in position by a latch 39, is kept continually in a to-and-fro motion. If the latch 39 is withdrawn, the pin 38 will jump forward, engage the projection 40 of the rack 36 and carry said rack along in its downward movement. The rack 36 is returned to its initial position by the spring 41, and the pin 38 is pushed back again by this movement into its original position by a wedge-like member 49 whereupon the latch 39 again engages the pin 38 of the engagement device.

The withdrawal of the latch 39 is brought about by a projection 42 carried by a pushing rod 47. For this purpose the rod 47 is connected with the disk 31 by means of a rod 46, while disk 31 with every change of direction of the ratchet wheels 25 and 26 is moved in one or the other direction. Therefore the rod 47 is upwardly or downwardly moved with every turning movement of the disk 31, and while doing so its projection 42 works upon a double pawl 43, whereby the rod 47 when pushed downward, actuates the latch 39 thus releasing the engagement pin 38.

As has already been stated, the rack 36 participates in the thrust movement of the rod 37, whereby an automatic separation of both rods takes place in their return movement, by the fact that the pin 38 by striking against the inclined surface or wedge-like member is pushed back again and locked by the latch 39, the operating of the shearing or cutting device is thus repeated at intervals of equal duration. The length of time between each cutting operation is determined by the distance of the two abutment members 32 and 33. By a change of the adjustable abutment 33 therefore, as by positioning it in different holes formed in the surface of the disk 31 the movement for the meeting of the blades to effect a cut may be regulated. Therefore, since the intermittent movement is directly derived from the shaft 9 of the knife blade drum 1 and since with each turn or revolution of the drum the ratchet wheel is moved in either one or the other direction by one tooth, the number of steps taken is equal to the number of revolutions of the drum and therefore is also equal to the length of rolled rod to be passed through the shears or knife blades. The ratchet device therefore makes it possible to set the rack operating means to cut a definite length.

Manifestly, the construction shown is capable of considerable modification and such modification as is within the scope of my claims I consider within the spirit of my invention.

I claim:

1. A machine for subdividing bars comprising a plurality of rotary drums, co-acting rotary cutters extending radially of said drums and mounted on an eccentric within said drums to project the cutters into shearing relation, means for automatically actuating the eccentrics to project the cutters and means for regulating the cutting intervals of the cutters.

2. A machine for subdividing bars comprising a pair of rotary drums, a cutter rotating with each drum, eccentric pivots carrying said cutters, means for automatically controlling the movements of said pivots, and means for adjusting the pivots.

In testimony whereof, I have signed my name to this specification.

JOSEF HENRICH.